A. R. MEBANE.
HORSE DETACHER.
APPLICATION FILED OCT. 21, 1910.
1,002,170.
Patented Aug. 29, 1911.
2 SHEETS—SHEET 1.
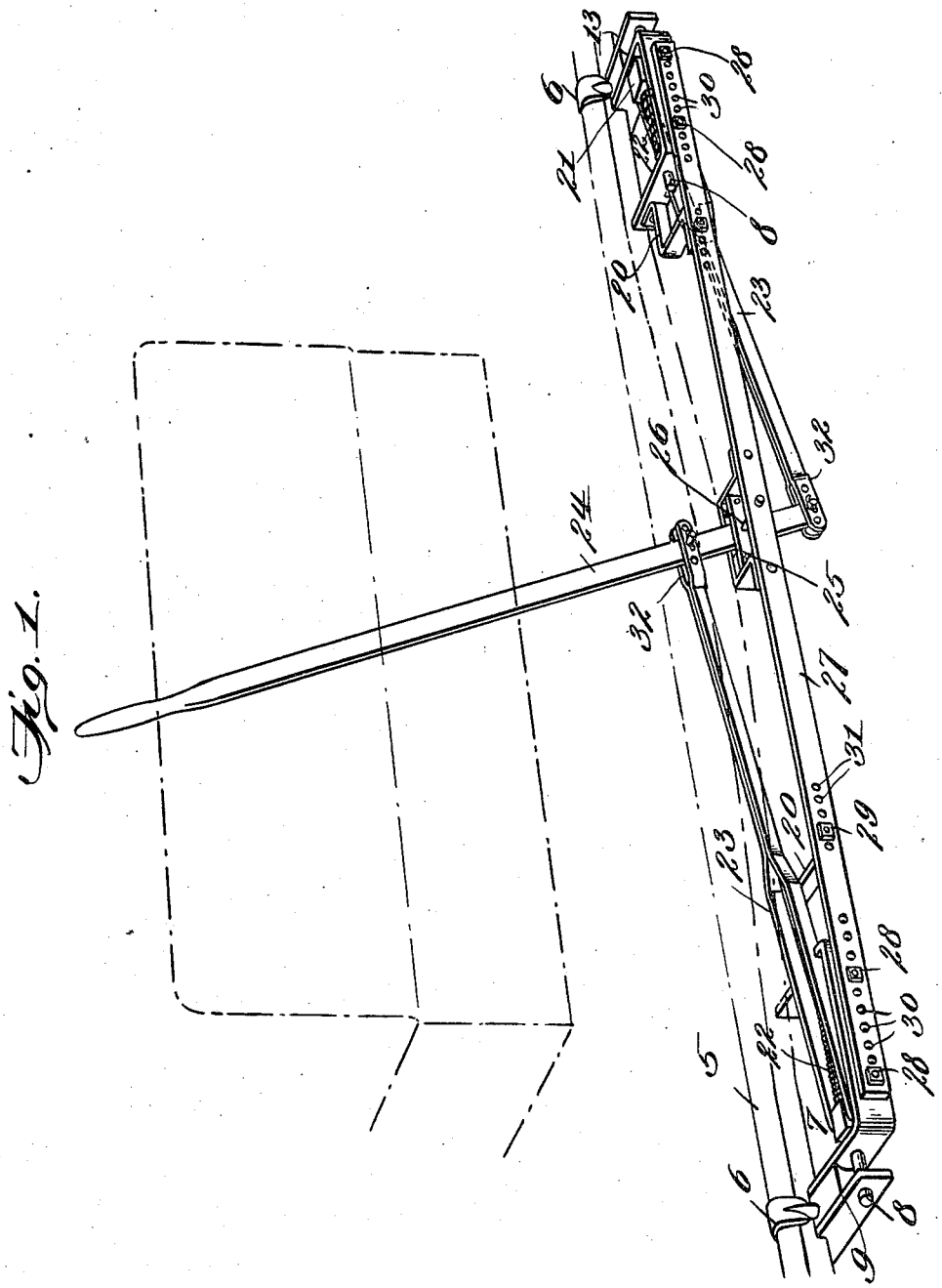

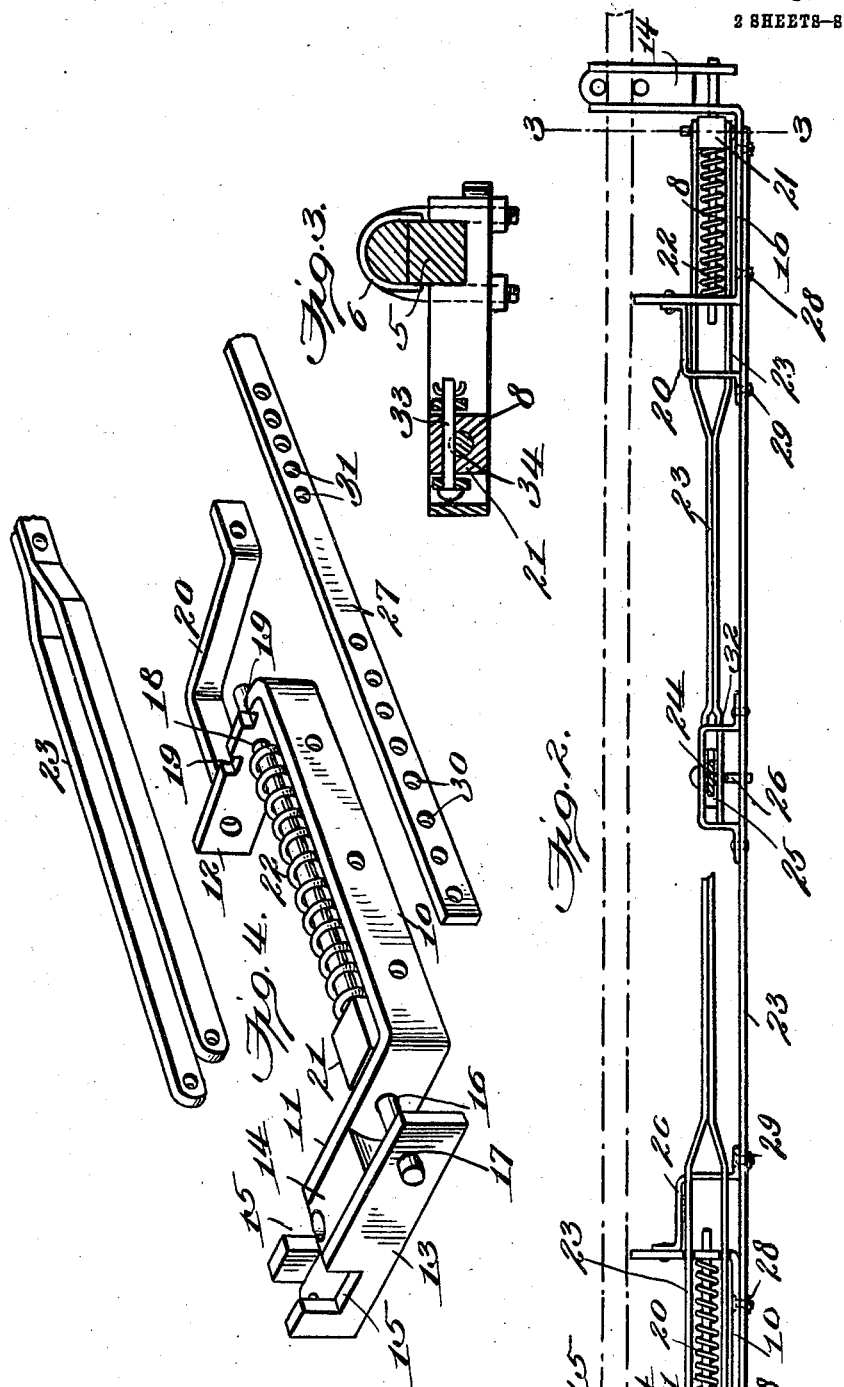

UNITED STATES PATENT OFFICE.

ALEXANDER RICHMOND MEBANE, OF HICKORY FLAT, MISSISSIPPI.

HORSE-DETACHER.

1,002,170. Specification of Letters Patent. Patented Aug. 29, 1911.

Application filed October 21, 1910. Serial No. 588,328.

*To all whom it may concern:*

Be it known that I, ALEXANDER R. MEBANE, a citizen of the United States, residing at Hickory Flat, in the county of Benton and State of Mississippi, have invented new and useful Improvements in Horse-Detachers, of which the following is a specification.

This invention relates to new and useful improvements in horse detachers, and the primary object of the same is to provide simple and positively operating means for detaching shafts and poles complete or as a whole from the front axle of a vehicle so as to release a horse or team of horses from a vehicle in case of a runaway and thereby relieve the occupants of a vehicle of all danger.

The improved detacher is of that special class of detachers which include positively supported straight sliding bolts at opposite extremities adapted to slidably engage and secure pole or shaft irons and a vertical oscillating lever with which said sliding bolts are connected by links or rods. In detachers of this special class as usually constructed there is considerable strain imposed upon the sliding bolts by the operating lever and connecting links or rods, and in time the said bolts wear their bearings or become bent and fail to satisfactorily operate. The present improvement has been particularly devised to obviate the disadvantages heretofore existing in this special class of horse detachers by preserving the bolts in their original straight condition through the medium of a specially constructed connecting means between the same and the oscillating operating lever therefor and attaching the said connecting means to the bolts so as to insure a straight inward pull without the least tendency to bending or pulling upwardly on the bolts.

In the drawings: Figure 1 is a perspective view showing a portion of a body of a buggy or runabout in dotted lines and a front axle having the improved detacher applied thereto, the shafts or thills being removed from the detacher. Fig. 2 is a top plan view of the detacher broken away in part and shown attached to an axle illustrated in dotted lines. Fig. 3 is a transverse vertical section on the line 3—3, Fig. 2. Fig. 4 illustrates detail perspective views of portions of the improved detacher.

The numeral 5 designates the front axle of a vehicle, and secured to and held in advance of each extremity thereof by a suitable clip 6 is a supporting frame 7 for a sliding bolt 8, each clip engaging the outer thill coupling extremity 9 of each frame. The frame 7 comprises a U-shaped bar 10 with the legs 11 and 12 projecting inwardly toward the axle, the leg 11 being longer than the leg 12 and disposed at the outer end of the frame. Spaced from and held associated with the leg 11 of the frame 10 is a bar 13, between which and the said leg 11 a block 14 is interposed and may consist of suitable resilient material. The bar 13 is shorter than the leg 11, but the rear ends of the bar and leg are terminally in alinement and at a short distance in advance of the terminals each is formed with an upwardly opening seat slot 15, the two slots receiving the axle and the clip 6 passing between the rear ends of the bar 13 and leg 11, the front leg of the clip extending downwardly through the rear extremity of the block 14. The leg 11, bar 13 and interposed block 14 constitute the components of the thill coupling at the outer end of each frame, and the front end of the block 14 will be suitably concaved, as shown, to conform to the convexity of the thill or coupling iron which is interposed between the forward extremities of the leg 11 and bar 13 for engagement by the bolt 8 which is disposed and has movement in openings 16 and 17 respectively formed in the leg 11 and bar 13 in advance of the front end of the block 14. The bolt 8 is continued entirely across the frame 10 and its inner end movably projects through an opening 18 in the leg 12 at a suitable distance rearwardly from the front cross-bar of the said frame. The upper edge of the leg 12 of one frame 10 on opposite sides of the plane of the bolt 8 is formed with notches 19, and to the inner extremity of the said leg 12 an angle brace 20 is secured and projects forwardly and has its front end in a plane coincident with the outer surface of the front cross-bar of said frame 10. Rigidly fixed on the bolt 8 and normally positioned close to the inner side of the leg 11 where the said bolt passes through the leg is a draw block 21 between which and the leg 12 a spring 22 is interposed and surrounds the bolt 8 so as to always force the bolt outwardly into engagement with the openings 16 and 17 and fully across the space between the forward extremities of the leg 11 and bar 13.

Pivotally connected to the front and rear sides of the block 21 are the free ends of a bifurcated draw-bar or connecting lever 23 which may be preferably composed of two bars of strap iron or steel bent into shape as shown to engage the block and having their inner portions drawn into close engagement and connected to a vertical oscillating lever 24 which is of such length as to extend slightly above the dashboard of the vehicle within easy reaching distance of the occupant. The lever 24 is fulcrumed at a point above its lower end in a fulcrum seat 25 as at 26, said fulcrum seat being constructed on the inner side of a connecting bar 27 adjustably attached at opposite extremities to the outer sides of the cross-bars of the frames 10 and to the front extremities of the braces 20 through the medium of suitable bolts and nuts 28 and 29, a plurality of openings 30 and 31 being formed in the bar 27 to compensate for adjustment of the frames thereon or of the bar on the frames to accommodate vehicles of different widths. The inner ends of the draw or connecting levers 23 are also bifurcated as at 32 and adjustably attached to the oscillating lever 24 respectively above and below the fulcrum of the latter, as clearly shown by Fig. 1. One draw or connecting lever 23 extends upwardly over the leg 12 of one frame 10 and is adapted to engage the notches 19, and the other lever 23 extends under the corresponding leg of the remaining frame 10, the leg 11 of said remaining frame 10 having the notches 19 formed in its lower edge. It will be understood that this reverse position of the levers 23 is necessary in order to secure a positive operation of the same equally inwardly and outwardly in accordance with the movement of the lever 24 and springs 22 when the latter are free to operate after compression. As shown by Fig. 3, the outer bifurcated end of each lever 23 is secured to its block 21 by a pin 33, see Fig. 3, which extends transversely through the block and through a groove as 34 in the bolt 8, and by this means the levers and blocks and bolt may be separably assembled and the block held in positive position on the bolt.

In the operation of the improved detacher the springs 22, when free to act, force the bolts 8 outwardly into locking position, and in order to detach shafts or thills the occupant of the vehicle forces or turns the lever 24 over toward the left, thereby drawing inwardly on the levers 23 and likewise moving the bolts 8 against the resistance of the springs 22. In this inward drawing movement a straight pull is exerted on the bolts in view of the fact that the bifurcated ends of the levers 23 are pivoted directly to the blocks 21 and primarily the bifurcated ends of the levers are held in close relation to the bolts through the medium of the reversely positioned notches 19 in the legs 12 of the two frames 10. These notches 19 provide a clearance for the levers 23 in their preliminary inward movement or at a time when the said levers are close to the legs 12 and would bear on the latter but for the notches and thereby obviate any tendency to bending action of the levers and upward pulling strain on the blocks, the levers gradually rising while the blocks are moving regularly in horizontal planes inwardly in the frames 10. By this means the levers 23 are caused to exert a straight pull on the bolts substantially through the longitudinal axis of the said bolts. An equal pulling strain is also exerted on the bolts through the medium of the blocks and the attachment of the bifurcated ends of the levers to opposite sides of the blocks and within the frames in which the bolts are mounted, and consequently lateral tensions on the bolts are also avoided as the pulling strain is imposed at diametrically opposite points in relation to the bolts. By attaching the blocks 21 to the bolts through the medium of the pins 33 which also serve as the fulcrum means for the outer bifurcated ends of the levers, strong and durable key means are provided for holding the blocks positively on the bolts against rotary displacement without materially weakening the said bolts or requiring extra fastening means to obtain a reliable connection. This operation is essential as it insures a straight movement of the bolts and avoids injury to the working parts which should be preserved against the least bending or distortion. Furthermore, by the positive inward straight pull exerted on the bolts they are prevented from materially wearing the walls of the openings 16 and 17, and therefore the bolts will not become loose in their supporting means and remain in reliable condition for accurately engaging and releasing the thill irons applied in the thill couplings at the outer ends of the frames, as hereinbefore explained. Furthermore, owing to the arrangement of the levers as hereinbefore explained, only a slight pull or operation of the oscillating lever 24 is required to detach the thills or to draw the bolts 8 inwardly. A further advantage in the arrangement hereinbefore explained is that the draw or connecting levers 23 are attached at their outer ends to the bolts 8 nearer the outer ends of said bolts instead of to the ends of the bolts nearest the oscillating lever 24, and by this means a more positive pull and reliable operation of the bolts will ensue without bending the draw levers 23 or cramping the bolts in their straight movement.

The improved detacher may be readily applied to any vehicle without special preparation of the latter simply by using the ordinary clips, and the organization of the improved detacher is also simple and comparatively cheap in construction and also adjustable to accommodate shafts or draft pole arrangements of any width.

It will be obvious that changes in the proportions, dimensions and minor details of construction may be adopted without departing from the spirit of the invention.

What is claimed as new is:

In a horse detacher, the combination of open frames having means at their outer extremities for receiving coupling irons of shafts or poles, the inner legs of the frames respectively having their upper and lower edges formed with a pair of recesses, a connecting bar adjustably attached at its opposite extremities to the front portions of the frames, a straight bolt slidably mounted in each frame and provided with a spring normally projecting the outer extremity of the bolt transversely across the adjacent coupling iron receiving means, a pull block removably mounted on each bolt adjacent to the outer extremity of the latter, the outer ends of the springs bearing against the inner ends of the blocks, reversely extending draw levers having outer bifurcated extremities, each bifurcated extremity terminally embracing opposite sides of the block and connected to the latter by fulcrum means which also serves to secure the block to the bolt, the recesses in the inner legs of the frames providing a clearance for the bifurcated extremities of the levers in the preliminary operation of the latter to insure a straight pull on the bolts when the levers are drawn inwardly and at points within the frames, and an upwardly projecting operating lever fulcrumed to the connecting bar and having the inner extremities of the draw levers adjustably and movably attached thereto.

In testimony whereof I have hereunto set my hand in presence of two subscribing witnesses.

ALEXANDER RICHMOND MEBANE.

Witnesses:
J. P. COTSHARP,
J. W. CRAWFORD.